UNITED STATES PATENT OFFICE.

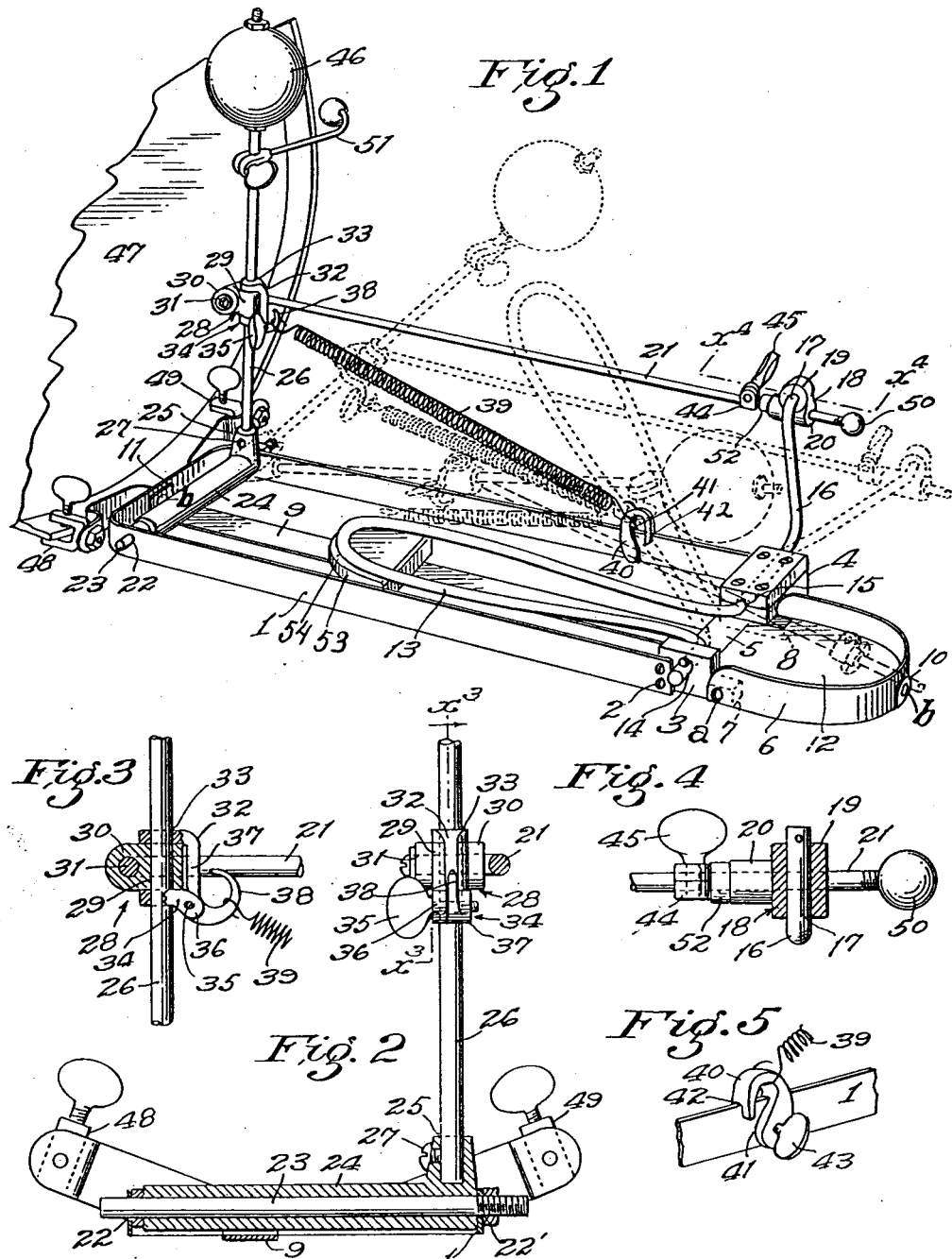

JOHN D. TOBIAS, OF LOS ANGELES, CALIFORNIA.

DRUMMER'S PEDAL.

1,031,598.  Specification of Letters Patent.  Patented July 2, 1912.

Application filed November 14, 1910. Serial No. 592,352.

*To all whom it may concern:*

Be it known that I, JOHN D. TOBIAS, a citizen of the United States, residing at Los Angeles, in the county of Los Angeles and State of California, have invented a new and useful Drummer's Pedal, of which the following is a specification.

Objects of this invention are; to provide a drummer's pedal which will allow great freedom of action of the drummer's foot; to provide a drummer's pedal having superior mechanical action whereby maximum speed and ease of operation may be obtained; to secure maximum speed with a minimum exertion; to provide for perfect adjustment to suit the individual drummer; and to prevent muting.

Other objects are cheapness, strength, durability and compactness.

The invention may be carried out in various forms.

The accompanying drawings illustrate the invention in the form at present deemed most desirable.

Figure 1 is a perspective view of a drummer's pedal constructed in accordance with this invention. Parts are shown by solid lines in the position just after the stroke has been given and by dotted lines as the parts will appear when perfectly free. Broken lines indicate the position of parts when the device is ready to be packed for storage or transportation. Fig. 2 is an elevation from the left of the beater rod in Fig. 1 showing the foot of the beater rod in longitudinal section and mounted on its bearing. Fig. 3 is a sectional detail of the joint between the beater rod and the thrust rod. This view is from line $x^3$, Fig. 2. Fig. 4 is a sectional detail from line $x^4$, Fig. 1, showing the joint between the tread arm and the thrust rod. Fig. 5 is a detail of the adjustable connection between the returning spring and the frame viewed from the farther side of Fig. 1.

The frame 1 may be made of a metal strap bent into elongate U-shape form and suitably connected as by screws or rivets 2 with bearing boxes 3, 4, which are connected together by a bar 5 and to which is connected the heel socket 6 that is a U-shape strap of metal fastened at its ends by screws *a* or other suitable means to studs 7, 8, that project rearwardly from the bearing boxes 3 and 4.

A center bar 9 of strap iron or other suitable material is bent up at its ends to form ears 10, 11, one of which is fastened by rivets *b* to the heel socket 6 and the other to the middle of the U-frame 1. The heel plate 12 of fiber or other suitable material is fitted friction tight in the space between the bearing boxes and the heel socket and rests upon the center bar 9.

The bearing box 4 is made in two pieces fastened together by suitable means, so as to allow the tread to be easily mounted.

The tread 13, journals 14, 15, and upright actuating arm 16 of the pedal are made of one piece of round iron or other metal bent to form an intermediate loop which constitutes the tread between the journals 14, 15, that are practically normal to the axis of the tread, one of said bearings terminating in the upright actuating arm 16 which is practically normal to the axis of the journal and also to the axis of the tread and terminates in a crank pin 17 which is elevated above the frame a distance of three or four inches, more or less.

The right angle thrust-block 18 is journaled on the crank pin 17 and is provided with rotary and slip bearings 19 and 20 normal to each other, to accommodate the crank pin 17 and the slipping thrust rod 21; one being above the other.

The closed end of the frame 1 is provided with two seats 22, 22', which may be made by simply perforating the strap that forms the frame loop; and in said seats there is seated a bearing rod 23 which forms a support for the beater bearing 24 that extends between the loop arms of the frame and is held in place by said arms near the end of the loop and is provided with a socket 25 in which the beater arm 26 is fixed by means of the set screw 27. On the beater arm 26 there is adjustably mounted a right angle thrust joint 28 having a beater arm bearing 29 and a bearing 30 for a pin 31 on the end of the thrust rod. The beater arm thrust joint 28 is adjustably mounted on the beater arm by a sliding bracket 32 having an eye 33 around the beater arm above the thrust rod joint 28, and a clamp 34 below said joint, provided with a thumb screw 35 which slides through one arm 36 of the loop and screws into the other arm 37 of said loop to draw the loop together and clamp the beater arm 26. The bracket is provided with a hook 38 to which one end of the retracting spring 39 is fastened, the other end being fastened to adjustable spring supporting means comprising the hook 40 which is adjustably mounted on the frame 1; being for this purpose provided with slots 41 and 42 to straddle one of the horizontal arms of the frame 1 and fastened by a thumb screw 43 which screws through the base of the hook and against the frame 1. An adjustable stop 44 having a thumb screw 45 is mounted on the thrust rod 21 to receive the thrust of the thrust block 18, so that when the tread 13 is depressed and the thrust block thrust forward, the thrust rod 21 will be thrown forward, thus impelling the beater arm 26 which is provided with the head 46 to beat the drum 47, which is clamped to the frame 1 by swivel clamps 48 and 49. The thrust rod may be provided at its free end with an enlarged removable tip 50 to prevent accidental withdrawal of the thrust rod from the thrust block. By removing the tip 50 the thrust rod may be withdrawn from the thrust block and then the parts may be brought into the compact position shown in broken lines in Fig. 1.

The beater arm may be provided with a cymbal arm 51 in the usual manner.

A fiber washer 52 is provided between the thrust block 18 and the stop 44 to prevent noise.

A toe rest comprising a fiber plate 53 and a plush pad 54 is mounted on the middle bar 9 to cushion the tip of the tread at the end of a stroke.

The thrust rod 21, stop 44, spaced apart from the tip 50 with the thrust block 18, crank 17 and upright actuating arm 16 constitute power transmitting mechanism between the tread and the beater arm which permits of lost motion and adapted to operate the beater to beat the drum. The means comprising the thrust rod 21, stop 44, thrust block 18 and crank 17 constitute means operated by the actuating arm to thrust the beater arm forward, and the sliding thrust block 18 has a limited movement determined by the movement of the tread 13.

In practical use the tread may be operated through a long or short arc according to the requirements of the music or the pleasure of the drummer and the parts will be so adjusted that when the tread is on the toe-rest, the thrust rod will be positively moved forward into position to bring the beater arm to upright position; and sufficient free space is provided between the stop and the free end of the thrust rod to allow the rod to slip through the thrust block far enough to allow the beater head to strike the drum head; the spring allowing such action to take place and immediately returning the beater arm after the stroke. The tension of the spring may be adjusted at pleasure by changing the position of the clamp hook on the frame 1. The gear of the action may be adjusted by raising or lowering the thrust joint on the beater arm. By raising the thrust joint on the beater arm, the movement of the tread is lengthened and the action is softened. By lowering the thrust joint on the beater arm the movement of the tread is shortened and the action is quickened. The adjustment is thus easily changed to meet individual needs.

The thrust block 18 constitutes means on the upright actuating arm 16 to slidingly support the thrust rod 21 to allow loose motion for the beater arm 26 so that when the stroke has been given, the resilient retracting means 39 at once draws back the beater arm, thus retracting the beater head 46 from the head of the drum 47 thereby preventing muting and allowing a quick succession of strokes to be given.

It is thus seen that I have produced a drummer's pedal in which the stroke is carried from the axle of the tread directly to the beater arm by lost motion mechanism comprising an upright arm and connecting means in loose relation between the upright arm and beater arm to transmit the beat from the tread to the beater arm; and that said beater arm being journaled on the same plane with the tread, operates toward and from the drum head as the tread moves down and up, and that the action is adjustable in regard to speed and resistance to suit the drummer; the resilient retracting means 39 being capable of any required degree of tension.

The actuating arm 16 will operate upon the lost motion connection whenever said actuating arm is swung upward toward the beater arm.

I claim:

1. A drummer's pedal comprising a tread, an axle rigid with the tread, an upright rigid with the axle, a beater arm and a connection between the beater arm and the upright and in which the stroke is carried from the tread through the axle to the upright and from the upright directly to the beater arm.

2. In a drummer's pedal the combination with a beater arm journaled at one end, of a tread and an arm connected with the tread and adapted to stand upright when the tread is down, a thrust rod connected with the beater arm and slidably connected with the upright arm, means on the upright arm to slidingly support the rod, and a stop on the rod to be acted on by said means to move the rod to make the stroke.

3. A drummer's pedal comprising a frame, a beater arm journaled to the frame; a tread journaled to the frame and provided with an upright arm; a rod jointed to the beater arm and slidingly supported by the upright arm; a stop on the rod to receive the stroke from the upright arm and a spring to return the beater arm.

4. A drummer's pedal comprising a frame, a beater arm on the frame, a tread on the frame, and power transmitting mechanism which permits of lost motion comprising a rod, a stop on the rod and a sliding bearing between the tread and the beater arm said bearing being connected with the tread and adapted to allow for lost motion and to operate the beater arm.

5. A drummer's pedal comprising a frame, a beater arm on the frame, a tread on the frame, power transmitting mechanism comprising a rod, a stop on the rod and a sliding bearing between the tread and the beater arm said bearing being connected with the tread and adapted to allow for lost motion and to operate the beater arm to beat the drum, and resilient means to return the beater arm.

6. A drummer's pedal comprising a frame, a beater arm on the frame, a tread on the frame, power transmitting mechanism comprising a rod, a stop on the rod and a sliding bearing between the tread and the beater arm said bearing being connected with the tread and adapted to allow for lost motion and to operate the beater arm to beat the drum, and resilient means in adjustable relation to the frame to return the beater arm.

7. The combination with the bearing blocks, of a frame and heel socket fixed to the blocks on opposite sides thereof, a heel plate in the heel socket, a toe rest in front of the blocks, a tread journaled in the blocks and provided with an arm, a beater arm journaled to the frame in front of the toe rest, a thrust rod loosely connecting the beater arm and the arm of the tread and arranged to be thrust forward thereby when the tread is depressed, and resilient means to return the beater arm.

8. The combination with a frame, of a beater arm journaled to the frame, a tread journaled to the frame and provided with an arm having a crank pin, a thrust block journaled on the crank pin and provided with a slip bearing, a thrust rod provided with a stop to receive the thrust of the thrust bearing and provided with a pin, a bearing for said pin swiveled on the beater arm, and a clamp to adjustably support the beater arm bearing on the beater arm.

9. The combination with a frame, of a beater arm journaled to the frame, a tread journaled to the frame and provided with an arm having a crank pin, a thrust block journaled on the crank pin and provided with a slip bearing, a thrust rod provided with a stop to receive the thrust of the thrust bearing and provided with a pin, a bearing for said pin swiveled on the beater arm, a clamp to adjustably support the beater arm bearing on the beater arm, and resilient means connected with the clamp to retract the beater arm.

10. The combination with a pedal frame and an actuating arm, of a beater arm journaled to the frame, means operated by the actuating arm to thrust the beater arm forward, a spring connected with the beater arm to retract the same and means adjustably connected with the pedal frame to support the spring.

11. The combination with a journaled beater arm, of a journaled tread having an arm and a crank pin on said arm, a thrust block on the crank pin and provided with a slip bearing, a thrust rod sliding in the slip bearing, a joint connecting the thrust rod with the beater arm and a stop on the thrust rod to receive the thrust of the thrust block.

12. The combination with a journaled beater arm, of a journaled tread having an upright arm and a crank pin on said arm, a thrust block on the crank pin and provided with a slip bearing, a horizontal thrust rod sliding in the slip bearing, a joint connecting the thrust rod with the beater arm and a stop on the thrust rod to receive the thrust of the thrust block, and a sound absorber between the stop and the thrust block.

13. The combination with a pedal frame, of an actuating arm journaled to the frame; a beater arm journaled to the frame; a lost motion connection between the beater arm and the actuating arm and connecting its arms and operated by the actuating arm to thrust the beater arm forward; a spring connected with the beater arm to retract the same; and means connected with the pedal frame to support the spring.

14. A drummer's pedal comprising a frame; a beater arm on the frame, said arm being provided with a beater head; a tread on the frame; power transmitting mechanism which permits of lost motion and is operatively connected with the tread and the beater arm and is arranged between the tread and beater arm to transmit motion from the tread to operate the beater arm to beat the drum; and a spring to take up the lost motion thereby retracting the beater head from the drum to the extent of the lost motion.

In testimony whereof, I have hereunto set my hand at Los Angeles, California, this 29th day of October 1910.

JOHN D. TOBIAS.

In presence of—
  JAMES R. TOWNSEND,
  OLIVE DIFFENDERFER.